US012010382B2

(12) United States Patent
Epari et al.

(10) Patent No.: US 12,010,382 B2
(45) Date of Patent: Jun. 11, 2024

(54) PROVIDING ENHANCED VIEWING EXPERIENCE USING USER GAZE DETECTION AND VIDEO CASTING

(71) Applicant: ARRIS Enterprises LLC, Suwanee, GA (US)

(72) Inventors: Aurovind Sagar Epari, Karnataka (IN); Sandeep Guddekoppa Suresh, Bangalore (IN); Vinod Jatti, Bangalore (IN)

(73) Assignee: ARRIS Enterprises LLC, Horsham, PA (US)

( * ) Notice: Subject to any disclaimer, the term of this patent is extended or adjusted under 35 U.S.C. 154(b) by 9 days.

(21) Appl. No.: 17/647,260

(22) Filed: Jan. 6, 2022

(65) Prior Publication Data

US 2022/0286741 A1 Sep. 8, 2022

Related U.S. Application Data

(60) Provisional application No. 63/156,542, filed on Mar. 4, 2021.

(51) Int. Cl.
*H04N 21/44* (2011.01)
*G06F 3/01* (2006.01)
(Continued)

(52) U.S. Cl.
CPC ....... *H04N 21/44218* (2013.01); *G06F 3/013* (2013.01); *G10L 15/22* (2013.01);
(Continued)

(58) Field of Classification Search
None
See application file for complete search history.

(56) References Cited

U.S. PATENT DOCUMENTS

2011/0181683 A1\* 7/2011 Nam ............... H04N 21/485
348/E7.078
2020/0045363 A1 2/2020 Nellore et al.
(Continued)

OTHER PUBLICATIONS

Mahadeva et al., "Gaze Control: A Natural Human-Computer Interaction Systems", ARRIS Group Inc, (Month unknown 2018), (5 pages).

*Primary Examiner* — Samira Monshi
(74) *Attorney, Agent, or Firm* — Panitch Schwarze Belisario & Nadel LLC

(57) ABSTRACT

Technologies are disclosed for controlling at least one media content presentation in a media stream by a media control device. The media stream may include one or more media content presentations. The media control device may communicate with a camera device and/or a display device. The media control device may receive one or more user-gaze detections captured via the camera device. One or more viewpoints on the display device may be ascertained that correspond to the one or more user-gaze detections. At least a first viewpoint of the one or more viewpoints may be ascertained, where the first viewpoint may correspond to a first largest number of similar viewpoints of the one or more viewpoints, and/or a most-recent viewpoint of the one or more viewpoints. The media control device may adjust at least one parameter of at least one media content presentation based on the first viewpoint.

36 Claims, 10 Drawing Sheets

(51) Int. Cl.
   *G10L 15/22*      (2006.01)
   *H04N 21/422*     (2011.01)
   *H04N 21/4223*    (2011.01)
   *H04N 21/431*     (2011.01)
   *H04N 21/436*     (2011.01)
   *H04N 21/442*     (2011.01)

(52) U.S. Cl.
   CPC ... *H04N 21/42203* (2013.01); *H04N 21/4223* (2013.01); *H04N 21/4316* (2013.01); *H04N 21/43615* (2013.01); *G10L 2015/223* (2013.01)

(56)              References Cited

U.S. PATENT DOCUMENTS

2021/0331564  A1*  10/2021  Cho ................... B60K 35/00
2022/0019281  A1*   1/2022  Olson .................. G06F 3/013
2022/0100270  A1*   3/2022  Pastrana Vicente ...................
                                                 G06F 3/04842

* cited by examiner

PROVIDING ENHANCED VIEWING EXPERIENCE USING USER GAZE DETECTION AND VIDEO CASTING

BACKGROUND

Media content (e.g., a form of more general electronic content) may be provided by a plurality of media content network operators to home and/or business subscribers/viewers. Media content network operators (e.g., cable network operators, satellite operators, etc.) may provide subscribers/viewers with various forms of media content, such as movies, concerts, premium media content, broadcast media content, and/or pay-per-view (PPV) media content, and/or the like.

Media content network operators deploy consumer premises equipment (CPE) in residential and/or commercial environments, among other consumer environments, as part of the media content delivery network. The various CPE devices are activated and/or configured based on a variety of factors, such as consumer identities, subscriptions, and/or preferences, etc.

Consumers, for various reasons, may wish to view more than one media content at the same time, perhaps for example on the same monitor and/or television. Media content network operators and/or media content producers/broadcasters may wish to provide consumers with various kinds of information (e.g., associated with the media content or associated with other subject matter), perhaps one the same monitor/television via which the consumer may be viewing the media content.

Consumer consumption of media content (e.g., video) may have significantly changed in recent time. For example, more video may be consumed via streaming mobile devices more each day. The consumer's enjoyment of viewing media content via mobile streaming devices may be provide the consumer with the advantage of mobility, for example within and/or outside of a user communication network.

SUMMARY

Technologies are disclosed for controlling at least one media content presentation in a media stream. The media stream may include one or more media content presentations. The media control device may be in communication with a camera device and/or a display device. The media control device may be a set-top box, a home gateway, a cloud-based computing device, an Internet Gateway, a router, a smart media device, a mobile device, a media gateway, a television, and/or a personal computing device.

The media control device may be configured to receive one or more user-gaze detections captured via the camera device. The media control device may be configured to ascertain one or more viewpoints on the display device corresponding to the one or more user-gaze detections. The media control device may be configured to ascertain at least a first viewpoint of the one or more viewpoints. The first viewpoint may correspond to a first largest number of similar viewpoints of the one or more viewpoints, and/or a most-recent viewpoint of the one or more viewpoints. The media control device may be configured to adjust at least one parameter of the at least one media content presentation based, at least in part, on the first viewpoint.

In one or more scenarios, the at least one media content presentation may include a content window, and/or a content field. In one or more scenarios, the at least one parameter comprises a content of the at least one media content presentation, a generation of the at least one media content presentation, a location of the at least one media content presentation, and/or a size of the at least one media content presentation. In one or more scenarios, the content window may be a main window, a sub-window, and/or a picture-in-picture (PIP). In one or more scenarios, the content field may be an alert field, a subtitle field, and/or a closed-captioning field.

In one or more scenarios, the media stream may include a first media content presentation and a second media content presentation. The first media content presentation may be displayed at a first display device location. The second media content presentation may be displayed at a second display device location. In one or more scenarios, the media control device may be configured to ascertain that the first viewpoint corresponds to the second display device location. The media control device may be configured to switch a content of the first media content presentation with a content of the second media content presentation, perhaps for example when it may be ascertained that the first viewpoint corresponds to the second display device location.

In one or more scenarios, the media stream may include at least a first media content presentation. The media control device may be configured to restrict a location of at least a second media content presentation from a location proximate to the first viewpoint, and/or a generation of the at least second media content presentation from a location proximate to the first viewpoint.

In one or more scenarios, the media control device may be in communication with a microphone device. The media stream may include at least a first media content presentation. The media control device may be configured to receive a first user-voice input via the microphone device. The first user-voice input may correspond to a user request to generate at least a second media content presentation. The media control device may be configured to generate the second media content presentation based for example, at least in part, on the first user-voice input. The media control device may be configured to receive a second user-voice input via the microphone device. The second user-voice input may correspond to a size of the second media content presentation, and/or a content of the second media content presentation.

In one or more scenarios, the media control device may be configured to ascertain a location of the second media content presentation based for example, at least in part, on the first viewpoint. The media control device may be configured to arrange the location of the second media content presentation on the display device, the content of the second media content presentation, and/or the size of the second media content presentation on the display device.

In one or more scenarios, the media control device may be configured to ascertain that the first media content presentation has a priority greater than that of a priority of the second media content presentation. In one or more scenarios, the restriction may be based on the priority comparison.

In one or more scenarios, the media control device may be configured to ascertain that the priority of the first media content presentation is greater than the priority of the second media content presentation based, for example, on a default media content presentation priority hierarchy, and/or a user-provided media content presentation priority.

In one or more scenarios, a media control device (e.g., a first media control device) may be configured to cast at least one media stream. The first media control device may be in communication with a communication network. The first media control device may be configured to receive the at least one media stream from a second media control device via the communication network. The first media control device may be configured to ascertain an occurrence of at least one casting condition. The first media control device may be configured to cast the at least one media stream to at least one other media control device via the communication network, perhaps for example when the at least one casting condition occurs.

In one or more scenarios, the first media control device may be configured to ascertain a clearance of the at least one casting condition. The first media control device may be configured to initiate a casting of the at least one media stream from the at least one other media control device, perhaps for example when the at least one casting condition clears. The first media control device may be configured to receive the at least one media stream from the at least one other media control device via the communication network.

In one or more scenarios, first media control device may be configured such that the at least one media stream may include over-the-top (OTT) video, cable video, broadcast video, and/or satellite video, for example.

In one or more scenarios, the first media control device may be configured such that the at least one casting condition may include a low battery detection in the first media control device, an incoming call detection on the first media control device, an incoming message detection on the first media control device, and/or a system update detection on the first media control device, among others, for example.

BRIEF DESCRIPTION OF DRAWINGS

The elements and other features, advantages and disclosures contained herein, and the manner of attaining them, will become apparent and the present disclosure will be better understood by reference to the following description of various examples of the present disclosure taken in conjunction with the accompanying drawings, wherein.

DETAILED DESCRIPTION

Figure 1:
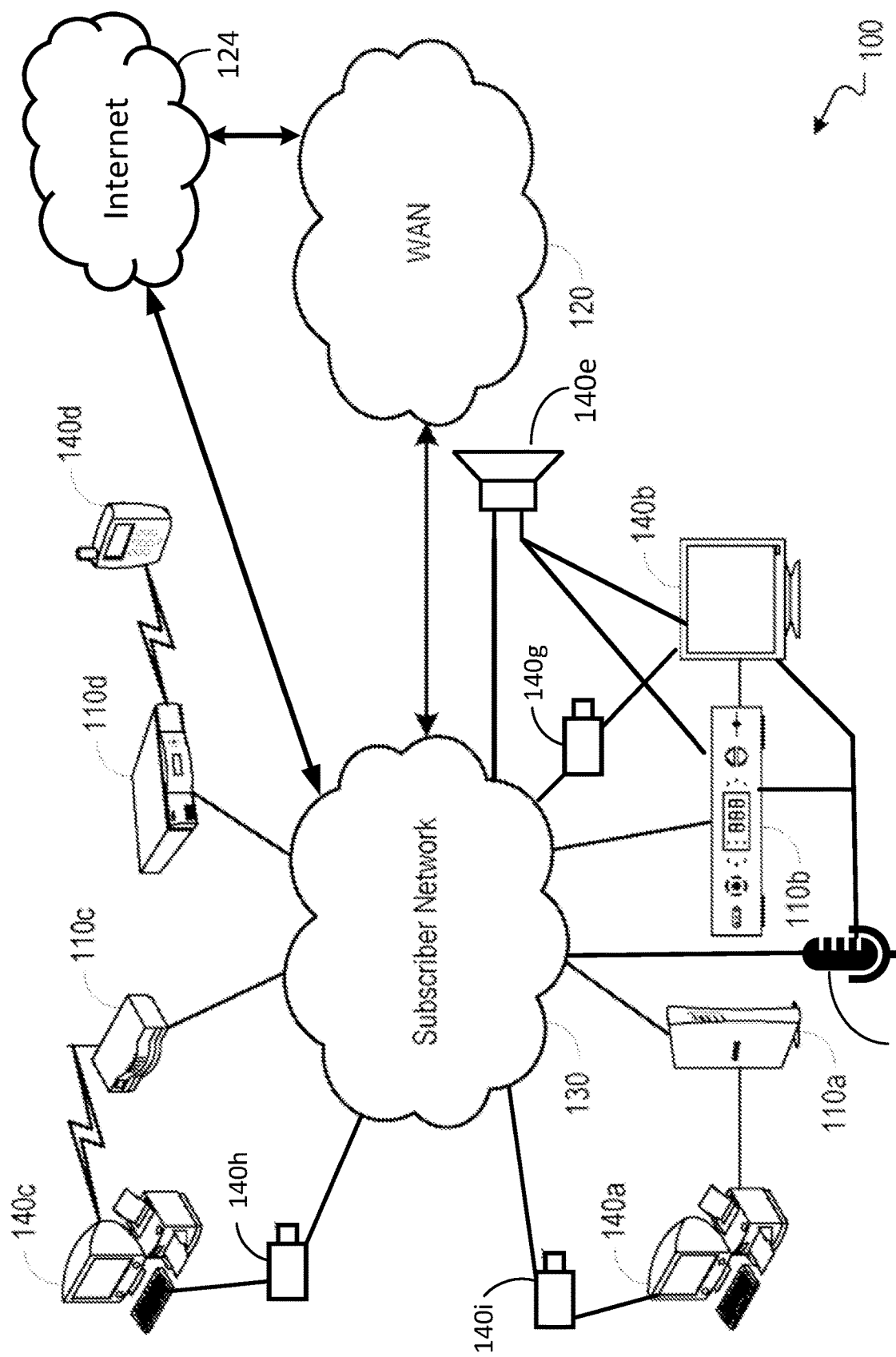
FIG. 1 is a block diagram illustrating an example network environment operable to deliver electronic content throughout the network via one or more network devices, such as a consumer premises device (CPE) device, among other devices.

For the purposes of promoting an understanding of the principles of the present disclosure, reference will now be made to the examples illustrated in the drawings, and specific language will be used to describe the same. It will nevertheless be understood that no limitation of the scope of this disclosure is thereby intended.

FIG. 1 is a block diagram illustrating an example network environment 100 operable for electronic content delivery. Electronic content may include media content, electronic documents, device-to-device communications, streaming media content, Internet/cloud-based electronic applications/services/databases, electronic communications/services (e.g., video/audio conferencing), Internet-based electronic services, virtual reality content and/or services, augmented reality content and/or services, media captioning content and/or services, electronic commerce, video components/elements of electronic content, and/or audio components/elements of electronic content, among other types of electronic content.

A media content delivery network operator, or MSO, may deliver media content to subscribers/viewers. Media content may be provided via a consumer premise equipment (CPE) and/or network gateway device supported by the MSO, for example. In one or more scenarios, CPE devices 110a-d receive video service(s) and/or data service(s) from a wide area network (WAN) 120 via a connection to a subscriber network 130. The one or more nodes of subscriber network 130 and/or the WAN 120 may communicate with one or more cloud-based nodes (not shown) via the Internet 124. The subscriber network 130 and/or WAN 120 may include a home gateway (not shown), that may be used to implement set-top box functionality, among other functions.

The CPE devices can include, for example, a modem 110a, a set-top box 110b, a wireless router including an embedded modem 110c, or a media gateway 110d, among many others (e.g., digital subscriber line (DSL) modem, voice over internet protocol (VOIP) terminal adapter, video game console, digital versatile disc (DVD) player, communications device, hotspot device, etc.). The subscriber network 130, for example, can be a hybrid fiber-coaxial (HFC) network, a local area network (LAN), a wireless local area network (WLAN), a cellular network, a personal area network (PAN), as well as others. As used herein, a media control device may any of the devices 110a-110d and/or 140a-140i, an Internet Gateway, a router device, a set-top box (STB), a smart media device (SMD), a cloud computing device, any type of CPE, and/or any other suitable device (e.g., wired and/or wireless) that may be configured to perform one or more of the techniques and/or functionality disclosed herein, for example.

The CPE devices can facilitate communications between the WAN 120 and client devices 140a-140i. A cable modem or embedded MTA (eMTA) 110 a can facilitate communications between the WAN 120 and a computer 140a. A set-top box 110b can facilitate communications between the WAN 120 and a television/monitor 140b (e.g., a media presentation device) and/or a digital video recorder (DVR). A wireless router 110c can facilitate communications between a computer 140c and the WAN 120.

The media gateway 110d can facilitate communications between a mobile device 140d (e.g., a tablet computing device, a smartphone, a personal digital assistant (PDA) device, a laptop computing device, etc.; one or more devices being PC-based, iOS-based, Linux-based, and/or Android-based, etc.) and the WAN 120. One or more speaker devices (e.g., sound radiation devices/systems) 140e may be in communication with the Subscriber Network 130, set-top box 110b, and/or television 140b, etc. Camera devices 140g, 140h, and/or 140i may be in communication with the computer 140a, the television 140b, the computer 140c, and/or the Subscriber Network 130, for example, among other devices and networks.

The one or more speaker devices 140e (e.g., surround sound speakers, home theater speakers, other external wired/wireless speakers, loudspeakers, full-range drivers, subwoofers, woofers, mid-range drivers, tweeters, coaxial drivers, etc.) may broadcast at least an audio component of electronic content/media content, among other audio signals/processes/applications. The one or more speaker devices 140e may possess the capability to radiate sound in pre-configured acoustical/physical patterns (e.g., a cone pattern, a directional pattern, etc.).

One or more microphone devices 140f may be external/standalone microphone devices. The one or more microphone devices 140f may be in communication with the Subscriber Network 130, set-top box 110b, television 140b, computer 140a, computer 140c, mobile device 140a, etc. Any of the client devices 110a-110d and/or devices 140a-140i may include internal microphone devices. The one or more speaker devices 140e (e.g., "speakers") and/or the one or more microphone devices 140f (e.g., "microphones", that may be "high quality" devices such as far field microphones, noise-cancelling microphones, shotgun microphones, dynamic microphones, ribbon microphones, and/or various size diaphragm microphones, Bluetooth™-based remote/control devices, RF4CE-based remote/control devices, etc.) may have wired and/or wireless connections (e.g., Bluetooth, Wi-Fi, private protocol communication network, etc.) to any of the other devices 140a-140i, the Subscriber Network 130, the WAN 120, and/or the Internet 124.

The camera devices 140g-140i may provide digital video input/output capability for one or more of the devices 110a-110d and/or devices 140a-140d. The camera devices 140g-140i may communicate with any of the devices 110a-110d and/or devices 140a-140f, perhaps for example via a wired and/or wireless connection. One or more of the camera devices 140g-140i may capture digital images and/or may scan images of various kinds, such as Universal Product Code (UPC) codes and/or Quick Response (QR) codes, for example, among other images. One or more of the camera devices 140g-140i may provide for video input/output for video conferencing (e.g., may serve as webcams or the like), for example, among other video functions.

Any of the camera devices 140g-140i may include microphone devices and/or speaker devices. The input/output of any of the camera devices 140g-140i may include audio signals/packets/components, perhaps for example separate/separable from, or in some (e.g., separable) combination with, the video signals/packets/components of any of the camera devices 140g-140i.

One or more of the camera devices 140g-140i may detect the presence of one or more people that may be proximate to the camera devices 140g-140i and/or that may be in the same general space (e.g., the same room) as the camera devices 140g-140i. One or more of the camera devices 140g-140i may gauge a general activity level (e.g., high activity, medium activity, and/or low activity) of one or more people that may be detected by the camera devices 140g-140i. One or more of the camera devices 140g-140i may detect one or more general characteristics (e.g., height, body shape, skin color, pulse, heart rate, breathing count, etc.) of the one or more people detected by the camera devices 140g-140i. One or more of the camera devices 140g-140i may be configured to recognize one or more specific people, for example. One or more of the camera devices 140g-140i may be configured to detect a user's/viewer's attention/gaze toward/on a monitor/television device (e.g., detecting a location on the monitor/television device that may correspond to a user's/viewer's attention/gaze toward/on the monitor/television device).

One or more of the camera devices 140g-140i may be use wireless communication with any of the devices 110a-110d and/or 140a-140d, such as for example Bluetooth™ and/or Wi-Fi™, among other wireless communication protocols. One or more of the camera devices 140g-140i may be external to any of the devices 110a-110d and/or devices 140a-140d. One or more of the camera devices 140g-140i may be internal to any of the devices 110a-110d and/or devices 140a-140d.

A user (not shown) may monitor (e.g., watch and/or listen to) and/or create media content and/or more generally interact with various kinds of electronic content on/from/via one or more of the devices 110a-110d and/or 140a-140i, among other devices (not shown), for example. The electronic content may be encrypted via one or more encryption techniques, such as symmetrical and/or asymmetrical encryption. Any of the devices 110a-110d and/or 140a-140i may utilize one or more digital certificates to initiate, and/or engage in, encrypted communication to obtain, interact, and/or monitor electronic content that may be conveyed via the Internet 124, the WAN 120, and/or the Subscriber Network 130, etc., for example.

For example, a CPE device, such as a set-top box 110b and/or any of the devices 110a-110d and/or 140a-140i, may be used to receive service from a network services provider. For various reasons, perhaps for example when a consumer engages a network services provider for a new/fresh service and/or a change in an existing service, and/or perhaps when a CPE device may be replaced (e.g., for maintenance, upgrade, etc.), one or more consumer profiles may be implemented on the CPE device (e.g., may need to be implemented).

CPE devices such as set-top boxes (STBs), media gateway devices, among others, may support visual and/or voice interface with users/viewers. This interface may support smart enhancement to the user/viewer experience, for example in the home or in any user network environment. One or more traditional and/or current viewer experience/use cases can be enriched to utilize visual and/or voice interface, perhaps for example to derive smart actions and/or results.

For example, formerly, a picture-in-picture (PIP) media content presentation/window may have been limited to display (e.g., regular) cable video media content. With smart media devices currently hosting video conferencing solutions, among other scenarios, a PIP window can be used to display video conferencing, among other non-traditional PIP window functions.

Currently, devices may provide selection (e.g., via remote control, or otherwise) of a primary media content presentation/window among one or more, or multiple, media content presentation/windows. For example, perhaps a viewer watching a television wishes to toggle between a first media content presentation (e.g., a media content of the viewer's primary interest) and a second media content presentation (e.g., a small/sub-window (PIP) of the viewer's secondary interest). The viewer may use a remote control to do so, but the viewer might be reluctant to do so (e.g., for various reasons, such as no functional remote control being handy, etc.). Thus, the viewer may continue watching the second media content presentation on the small/sub-window (e.g., PIP), even if the subject matter of the second media content presentation may become more interesting to the viewer than that of the first media content presentation.

Currently, a viewer may experience one or more scenarios in which, perhaps for example while watching a sports channel/event on a monitor/television display device (e.g., a first media content presentation), a scoreboard view (e.g., a second media content presentation) may be displayed on/in a limited area proximate to the top-right corner location/position of the display device. A third media content presentation (e.g., a PIP displaying another sports event, a news brief, etc.) may be displayed on the display device. For example, the third media content presentation may use a default location, such as near the top-right corner of the display device. This may cause a viewing conflict/override between the PIP window and the scoreboard view, likely interfering with and/or impeding the viewer's enjoyment of the viewing experience.

Currently, control, configuration, content, generation, placement/location, etc., of media content presentations in a media stream (e.g., PIPs, sub-windows, closed captions, subtitles, pop-up alerts, etc.) may be limited to certain default settings. And such parameters of media content presentations might not be adjustable by, and/or sensitive to, the viewer and/or the viewer's behaviors (e.g., the viewer's attention/gaze behaviors/patterns in watching a media content/media content stream/media stream on a display device).

For various reasons, consumers/viewers/users may wish to for content windows and/or content fields (e.g., sub-media content presentations) that may be added to the (e.g., primary) media content presentation they are viewing to be positioned in areas/positions of the display device (e.g., monitor and/or television, etc.) that do not interfere with and/or impede the viewer's enjoyment of the primary media content presentation.

Using current methods and/or devices, consumers/viewers/users might not have the service and/or capability to avoid the placement of added, small/sub media content presentations into/onto positions/locations of a display device that may be communicating one or more other/primary media content presentations in a media stream. Undesirable placements of small/sub media content presentations on the display device may interfere with the viewer's enjoyment of other/primary media content presentations, for example.

Technologies that may provide consumers/media content viewers/users with an ability and/or function such that control, configuration, content, generation, placement/location, among other parameters of media content presentations in a media stream may be sensitive to/adjustably by a viewer's behaviors/gazing patterns on/toward a display device could be useful.

In one or more scenarios, any of the devices 110a-110d, 140a-140i, among other devices, may be used by one or more media content (e.g., video) viewers/users to implement any of the capabilities, techniques, methods, and/or devices described herein.

The WAN network 120 and/or the Subscriber Network 130 may be implemented as any type of wired and/or wireless network, including a local area network (LAN), a wide area network (WAN), a global network (the Internet), etc. Accordingly, the WAN network 120 and/or the Subscriber Network 130 may include one or more communicatively coupled network computing devices (not shown) for facilitating the flow and/or processing of network communication traffic via a series of wired and/or wireless interconnects. Such network computing devices may include, but are not limited, to one or more access points, routers, switches, servers, computing devices, and/or storage devices, etc.

Figure 2:
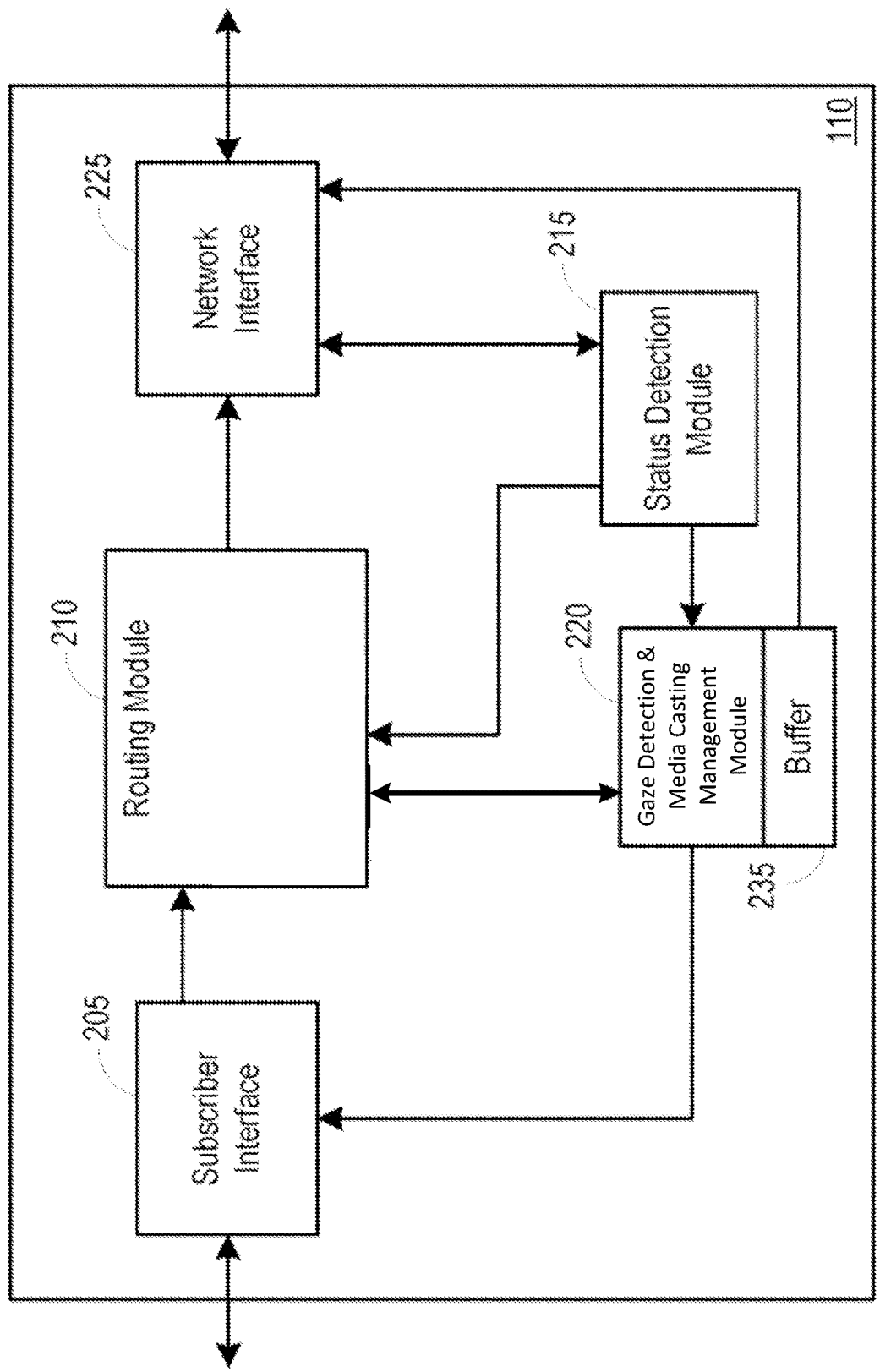
FIG. 2 is a block diagram illustrating an example CPE device of FIG. 1 that may be configured to deliver electronic content to a subscriber.

FIG. 2 is a block diagram illustrating an example CPE device 110 (e.g., any of the devices 110a-110d) operable to output audio/visual electronic content/media content, and/or receive same, to/from one or more devices, such as for example, the television/monitor 140b, mobile device 140d, computer 140c, computer 140a, one or more speaker devices 140e, one or more microphone devices 140f, and/or camera devices 140h-140i, etc. The CPE device 110 can include a subscriber interface 205, a routing module 210, a status detection module 215, a gaze detection & media casting management module 220, and/or a network interface 225.

In one or more scenarios, the CPE device 110 may receive a communication from a subscriber or subscriber device (e.g., subscriber device 140a-140i of FIG. 1). For example, the communication can be a request for data and/or a service from a network (e.g., WAN 120 of FIG. 1). A communication received from a subscriber or subscriber device can be received as a resource identifier (e.g., URL, and/or an IP address, and/or other formats).

In one or more scenarios, a routing module 210 may route a received communication to a network interface 225. The routing module 210 may route the communication to the network interface 225. The routing module may translate the received communication from a URL to an IP address.

In one or more scenarios, a media control device (e.g., set-top box 110b and/or any of the devices 110a-110d and/or 140a-140i, among other devices) and/or its gaze detection & media casting management module 220 may be configured to service viewer-gaze-detection based adjustment of one or more parameters of a media content presentation, for example in a media stream/media content stream, among other scenarios. In one or more scenarios, parameters such as location/placement, content, generation, among other parameters of media content presentations in a media stream being sensitive to/adjustable by a viewer's gaze/attention to a display device may enhance the viewer/user experience in near real time, for example.

Without the capabilities, techniques, methods, and/or devices described herein, the skilled artisan would not appreciate how to provide a service, function, and/or capability for adjusting one or more parameters of a media content presentation based on a viewer's gaze/attention to/toward a display device communicating a media stream/media content stream.

In one or more scenarios, a media control device and/or the gaze detection & media casting management module 220 of a media control device may be configured to control at least one media content presentation in a media stream. The media control device may be in communication with a camera device and/or a display device. The media stream may include one or more media content presentations. The media control device may be a set-top box such as device 110b, among other devices 110a-110d and/or 140a-140i, a home gateway, a cloud-based computing device, an Internet Gateway, a router, a smart media device, a mobile device, a media gateway, a television, or a personal computing device, among other devices, for example.

The gaze detection & media casting management module 220 may be configured to receive one or more user-gaze detections captured via the camera device. The gaze detection & media casting management module 220 may be configured to ascertain one or more viewpoints on the display device corresponding to the one or more user-gaze detections. The gaze detection & media casting management module 220 may be configured to ascertain at least a first viewpoint of the one or more viewpoints. For example, the first viewpoint may correspond to a first largest number of similar viewpoints of the one or more viewpoints, and/or a most-recent viewpoint of the one or more viewpoints, among other viewpoints.

In one or more scenarios, a viewpoint may be similar and/or substantially similar to another viewpoint, perhaps for example when both viewpoints are centered within a measure of some percentage of the diagonal length of the display device. In a non-limiting example, for a fifty-inch diagonal television, one viewpoint may be similar to another viewpoint in scenarios in which the centers of the two viewpoints are within two-and-a half inches (2.5") of each other, and/or are within five percent (5%) of the fifty-inch (50") diagonal length of the television of each other. Other viewpoint comparison tolerances/differentials are contemplated and fall within the scope of this disclosure.

Figure 6:
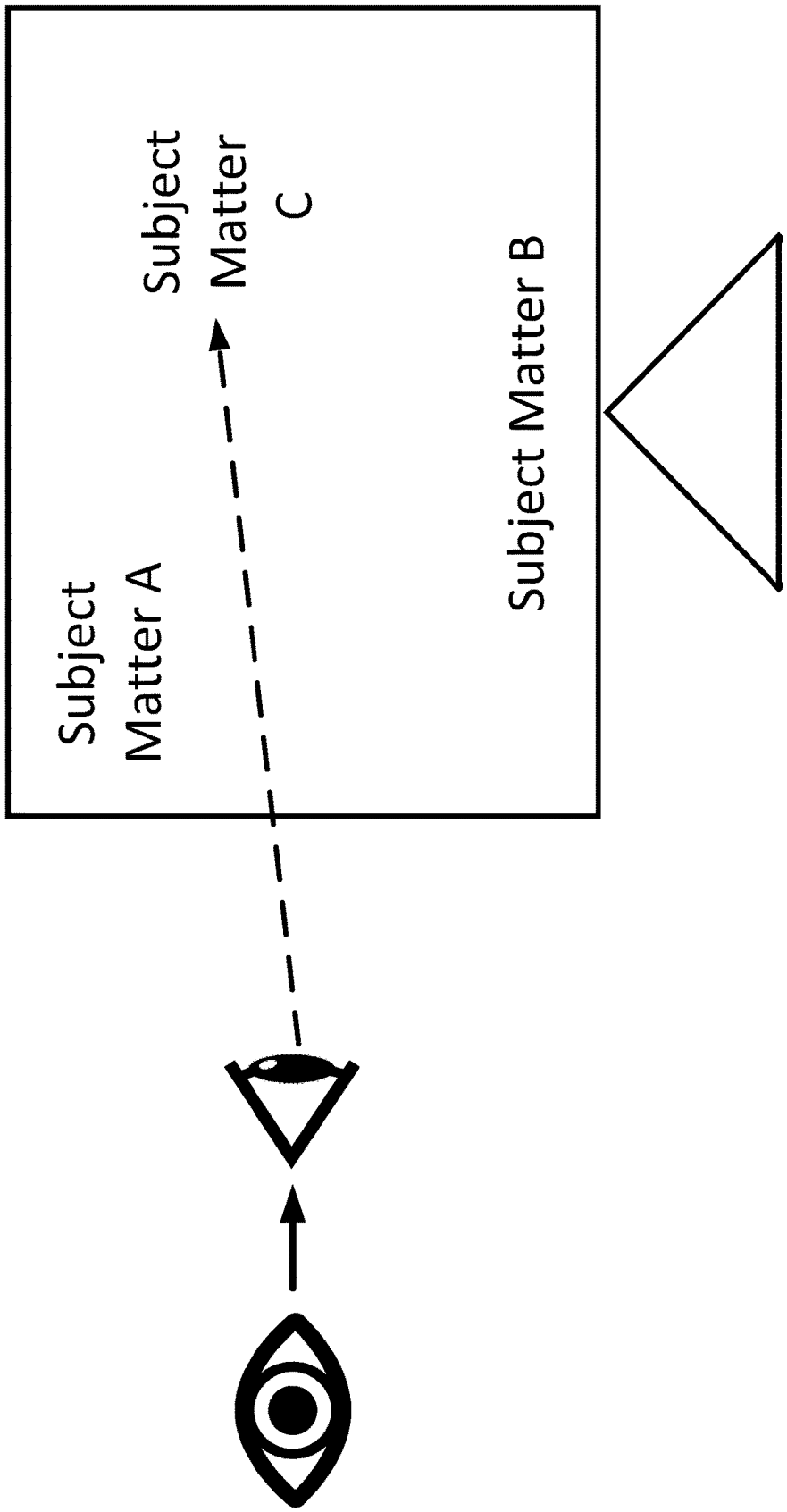
FIG. 6 is an example diagram of at least one technique of viewer gaze/attention detection.

FIG. 6 is an example diagram of at least one technique of viewer gaze/attention detection. Perhaps for example while viewing one or more media content presentations on a display device (e.g., a monitor or television), a viewer's eye gaze/visual attention may be directed to the display device area displaying subject matter C (e.g., a PIP communicating a sporting event). The viewer's gaze/attention to subject matter C might be more prominent/frequent/recent than the viewer's gaze/attention to the display device location presenting subject matter A (e.g., a main window communicating a news story of some import). The viewer's gaze/attention to subject matter A might be more prominent/frequent/recent than the viewer's gaze attention to the display device location presentation subject matter B (e.g., a closed-captioning content field communication the words of the news report of subject matter A).

In one or more scenarios, viewer gaze/attention detection and/or control may facilitate selection and/or toggling of the subject matter A and subject matter C content in their respective media content presentation locations. For example, if the viewer's gaze/attention focus is detected being substantially and/or most recently directed to the PIP window communicating the subject matter C (e.g., with the gaze/attention detection and/or control functions activated by the viewer), the PIP window can be highlighted (e.g., among other formatting such as blinking outline, etc.) for some configurable and/or predetermined time period (e.g., two seconds, four seconds, ten second, etc.).

Perhaps for example the viewer may continue to focus their gaze/attention on the PIP window for some other configurable and/or predetermined time period (e.g., for two second more, five more seconds, etc.). In such scenarios, among others, the subject matter C may be toggled with the subject matter A, such that the PIP window content and the main window content may be swapped. In one or more scenarios, should the viewer's gaze/attention focus not continue to be on the PIP window before the continued focus time period elapses, then the toggling/switching of the subject matter C content with the subject matter A content would be canceled, for example.

In one or more scenarios, the first largest number of viewpoints of the one or more viewpoints may correspond to a first largest number of similar viewpoints detected by the gaze/attention detection functionality. A second largest number of viewpoints may correspond to a second largest number of similar viewpoints detected by the gaze/attention functionality, and so on, for example.

In one or more scenarios, the most-recent viewpoint of the one or more viewpoints may correspond to the most-recent viewpoint temporally detected by the gaze/attention detection functionality, for example. In one or more scenarios, the at least one media content presentation may include a content window, and/or a content field, among other media content constituents, for example. In one or more scenarios, the content window may be a main window, a sub-window, and/or a picture-in-picture (PIP), for example. In one or more scenarios, the content field may be an alert field, a subtitle field, and/or a closed-captioning field, for example.

The gaze detection & media casting management module 220 may be configured to adjust at least one parameter of the at least one media content presentation based, at least in part, on the first viewpoint, for example. In one or more scenarios, the at least one parameter may include a content of the at least one media content presentation, a generation of the at least one media content presentation, a location of the at least one media content presentation, and/or a size of the at least one media content presentation, among other parameters, for example.

In one or more scenarios, the media stream may include a first media content presentation and/or a second media content presentation. The first media content presentation may be displayed at a first display device location, for example. The second media content presentation may be displayed at a second display device location, for example.

In one or more scenarios, a display device location can be described, measured, and/or located in a variety of manners, for example using Cartesian coordinates, polar coordinates, homogenous coordinates, ad-hoc coordinates, custom coordinates, and/or relativistic coordinates, and/or the like. The gaze detection & media casting management module 220 may be configured to determine correspondence between the one or more viewpoints as detected by the gaze/attention detection functionality and the one or more display device locations, for example.

The gaze detection & media casting management module 220 may be configured to ascertain that the first viewpoint may correspond to the second display device location. The gaze detection & media casting management module 220 may be configured to switch a content of the first media content presentation with a content of the second media content presentation, perhaps for example when/upon it may be ascertained that the first viewpoint corresponds to the second display device location.

In one or more scenarios, the media stream may include at least a first media content presentation. The gaze detection & media casting management module 220 may be configured to restrict a location of at least a second media content presentation from a location proximate to the first viewpoint, and/or a generation of the at least second media content presentation from a location proximate to the first viewpoint, among other restrictions, for example.

Figure 7:
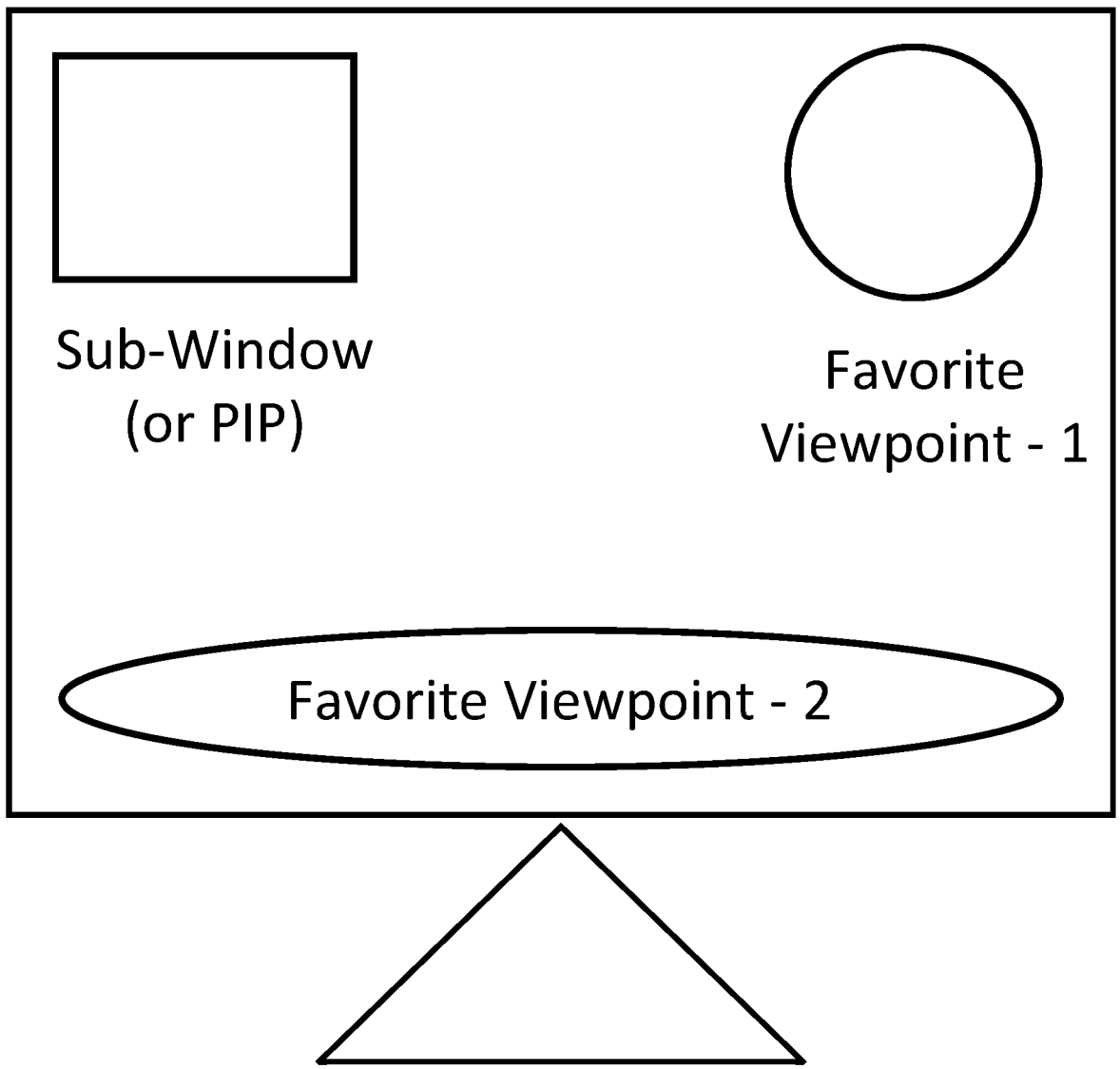
FIG. 7 is an example diagram of at least one technique of viewer gaze/attention detection.

FIG. 7 is an example diagram of at least one technique of viewer gaze/attention detection. A viewer, perhaps for example while a watching sports channel/sport event, may be frequently watching a scoreboard media content presentation placed on the top right corner of the display device. The viewer gaze/attention detection functionality may interpret the scoreboard media content presentation as a first (e.g., favorite) viewpoint of one or more detected viewpoints. The viewer may, perhaps somewhat less frequently, view a content field media content presentation that may communicate sports players' information/details at bottom of display device. The viewer gaze/attention detection functionality may interpret the sports players' information/details media content presentation as a second (e.g., favorite) viewpoint of one or more detected viewpoints, for example.

The viewer's gaze/attention detection and/or control functionality may consider/indicate/interpret the two viewpoints as a first and a second (e.g., favorite, frequent, etc.) viewpoint for some configurable and/or predetermined time period (e.g., ten minutes, a period/quarter of the sporting event, the entirety of the sporting event, thirty minutes, etc.). The viewer gaze/attention detection and/or control functionality may take such viewpoints into account and, for example, may restrict the location/placement of the sub-window/PIP from a display device location proximate to these two viewpoint areas. Such restrictions in the placement/location of the sub-window/PIP may avoid an override/block/impediment of the viewer's two (e.g., currently favorite) viewpoints.

In one or more scenarios, the media control device may be in communication with a microphone device. The media stream may include at least a first media content presentation. The gaze detection & media casting management module 220 may be configured to receive a (e.g., first) user-voice input via the microphone device. The first user-voice input may correspond to a user request to generate at least a second media content presentation, for example.

The gaze detection & media casting management module 220 may be configured to generate the second media content presentation based, for example at least in part, on the first user-voice input. The gaze detection & media casting management module 220 may be configured to receive a (e.g., second) user-voice input via the microphone device. The second user-voice input may correspond to a size of the second media content presentation, and/or a content of the second media content presentation, among other parameters of the second media content presentation, for example.

The gaze detection & media casting management module 220 may be configured to ascertain a location of the second media content presentation based, for example at least in part, on the first viewpoint. The gaze detection & media casting management module 220 may be configured to arrange the location of the second media content presentation on the display device, the content of the second media content presentation, and/or the size of the second media content presentation on the display device, among other parameters of second media content presentation, for example.

In one or more scenarios, the gaze detection & media casting management module 220 may be configured to ascertain that the first media content presentation has a priority greater than that of a priority of the second media content presentation. In one or more scenarios, the previously described restriction of the location of the at least a second media content presentation from the location proximate to the first viewpoint, and/or the restriction of the generation of the at least second media content presentation from the location proximate to the first viewpoint, among other restrictions, may be based on the priority comparison, among other scenarios, for example.

In one or more scenarios, the gaze detection & media casting management module 220 may be configured to ascertain that the priority of the first media content presentation is greater than the priority of the second media content presentation may be based on a default media content presentation priority hierarchy, and/or a user-provided media content presentation priority, for example. In one or more scenarios, the user/viewer may input priority criteria and/or priority levels for various kinds of media content presentations, for example.

Figure 8:
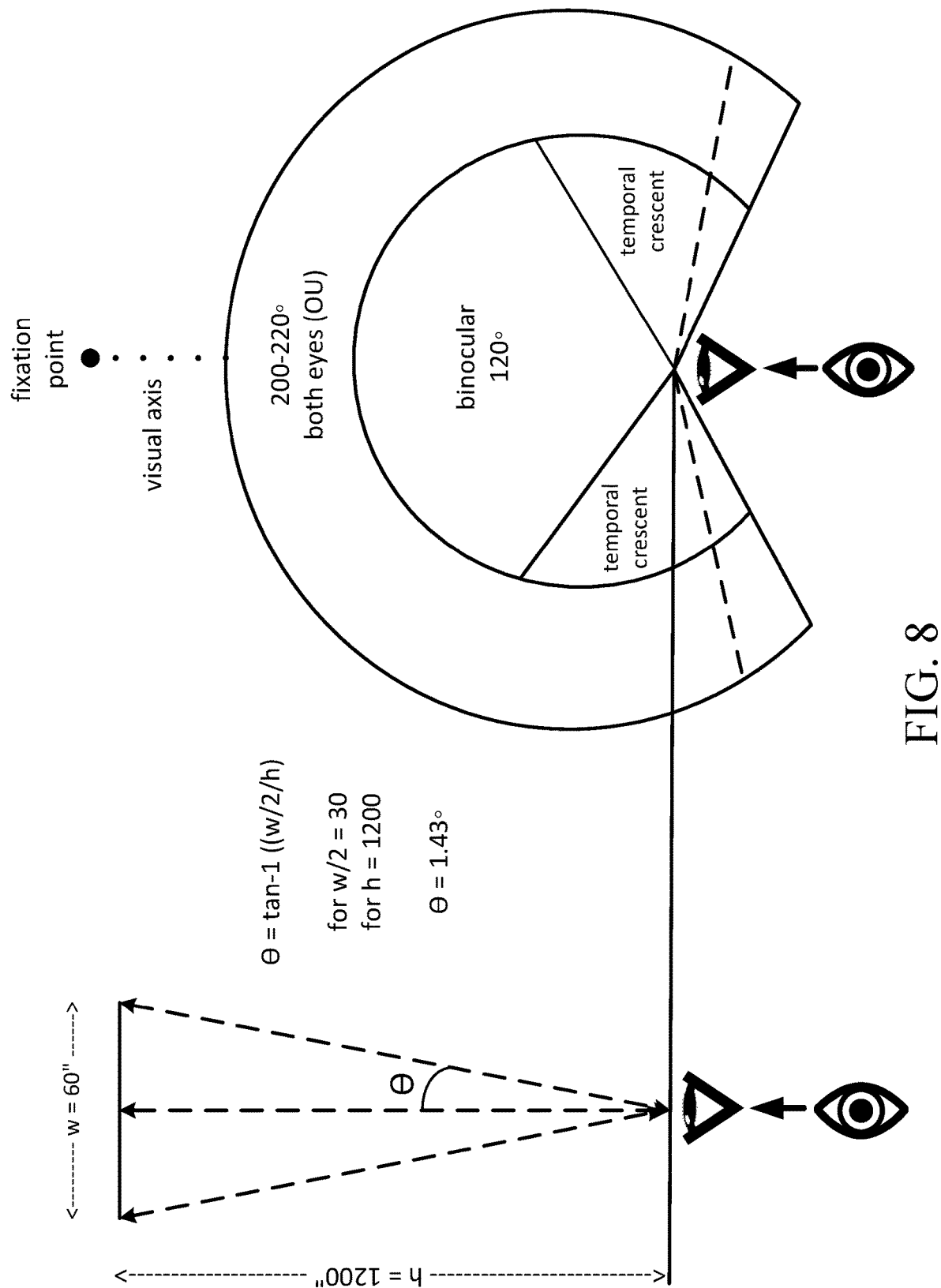
FIG. 8 is an example diagram of at least one technique of viewer gaze/attention detection.

FIG. 8 is an example diagram of at least one technique of viewer gaze/attention detection. FIG. 8 illustrates an example scenario of at least one measurement scheme of ascertaining a viewer's gaze/attention focus/fixation point that may be applied to one or more other scenarios.

Figure 9:
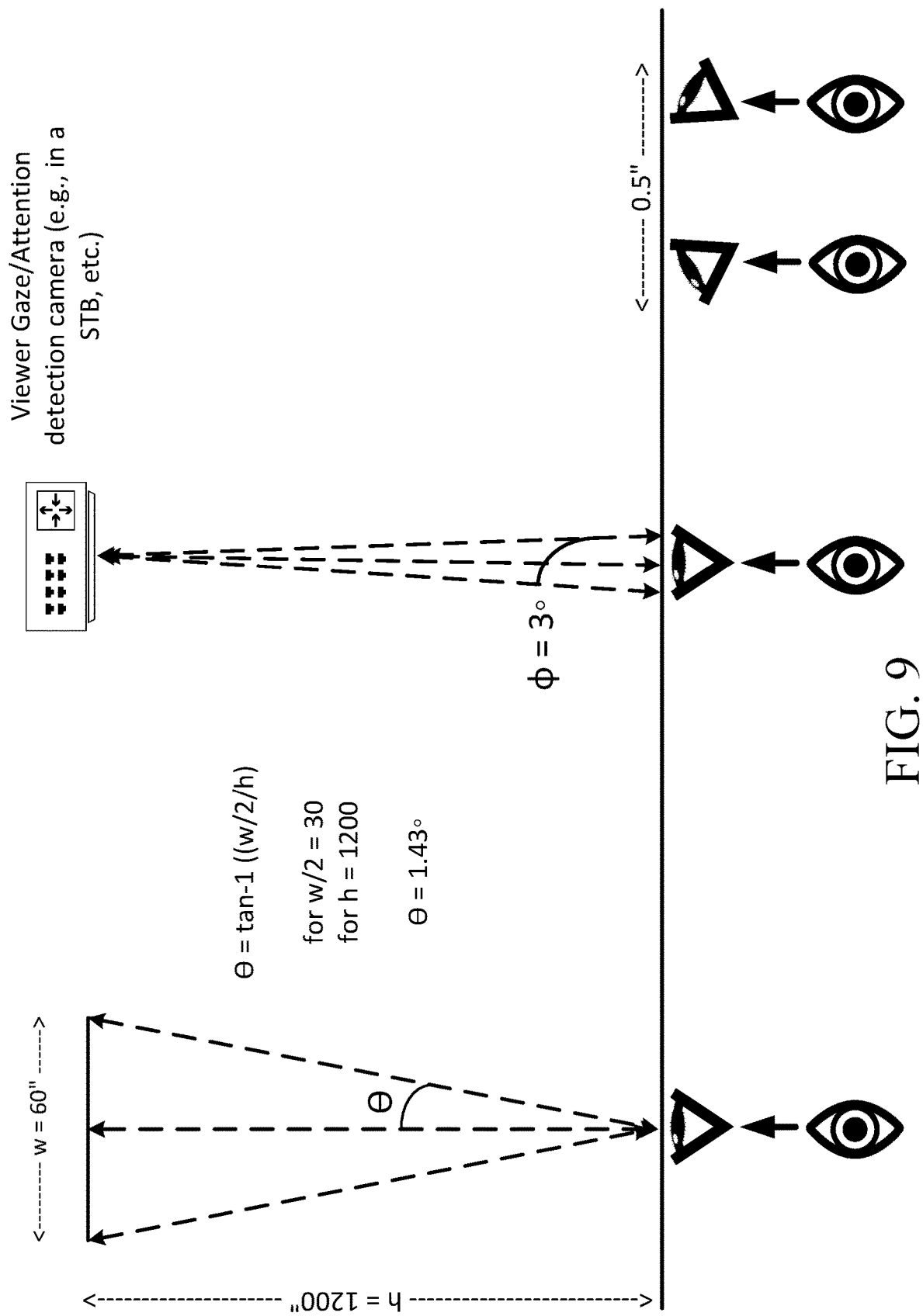
FIG. 9 is an example diagram of at least one technique of viewer gaze/attention detection.

FIG. 9 is an example diagram of at least one technique of viewer gaze/attention detection. FIG. 9 illustrates an example scenario of at least one measurement scheme of ascertaining a camera (e.g., digital camera) resolution for detecting a viewer's gaze/attention to/toward a focus/fixation point (e.g., on a display device) that may be applied to one or more other scenarios. In the example scenario of FIG. 9, the viewer's eye movement (e.g., with the viewer's head being substantially still with respect to the camera) from a left focus to a right focus (e.g., over full motion) may span 120°, for example. The viewer's pupil movement may span approximately 0.5", for example from end-to-end. In the example of w/2 being 30, which may represent 3/120 of 0.5", or 1/40 of an inch to 1/80 of an inch.

In one or more scenarios, for example for a horizontal axis, the aforementioned measurements and estimates may represent a use for a sensor that may serve 80 pixels per inch for detection of movement to within 1 pixel (e.g., far end to far end). For example, for coverage for a 25-foot horizontal span, a sensor specification may be 25×12×80, for approximately 24 k pixel in the horizontal. For example, for a 10 k pixel on the vertical, useful results may be achieved from a 90 MP to a 240 MP camera.

Figure 10:
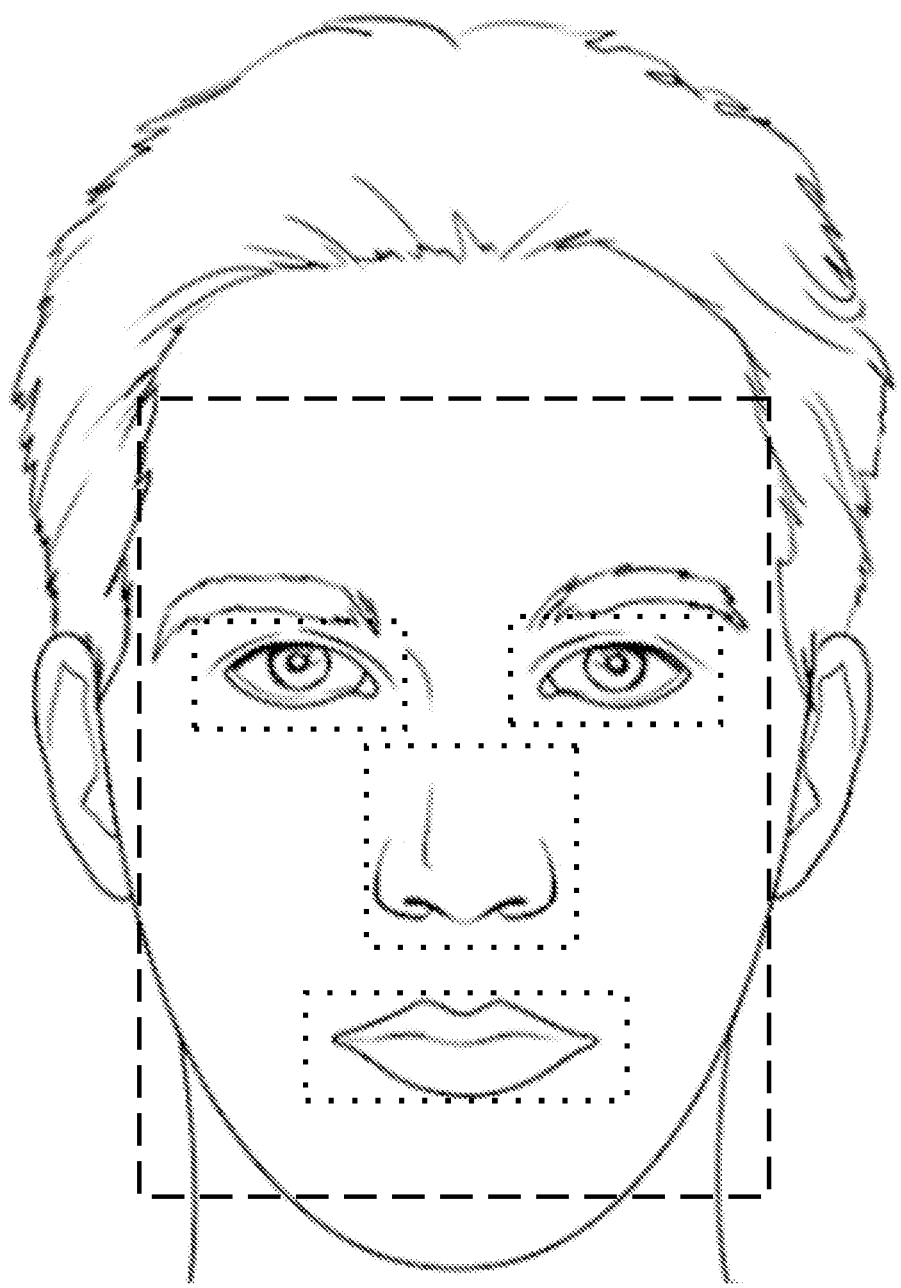
FIG. 10 is an example diagram of at least one technique of viewer gaze/attention detection.

FIG. 10 is an example diagram of at least one technique of viewer gaze/attention detection. In one or more scenarios, perhaps for example from the example face detection in FIG. 10, a facial feature extraction may be made. An iris estimation and/or a head pose estimation may be from the facial feature extraction. A gaze estimation may be made from the iris estimation and/or the head pose estimation, for example.

In one or more scenarios, for face detection, a machine learning based approach may be used. One or more techniques may employ a Haar-features based approach for object detection, which may make rapid and accurate object detections. For face detection, a classification may be made of the acquired image into face and non-face regions, for example. Haar-features based classifiers can be trained for the detection of one or more objects (e.g., face, eyes, etc.). These classifiers may be trained for false positive and false negative samples as well. At least one set of simple features may be obtained from training data. One or more Haar-features may be calculated by the difference between dark-region and light region pixel values, for example. A threshold value may be set/fixed at the learning stage. For example, a feature may be said to be present if a difference value is greater than the value fixed as the threshold.

In one or more scenarios, facial features extraction may utilize facial features identification and extraction, perhaps for example to compute one or more two-dimension (2D) gaze vectors.

In one or more scenarios, pupil localization techniques may be useful, as the pupil is the central and focusing part of eye, located at the center of iris. Light enters the eye through pupil. Finding the position of the pupil is a useful objective in one or more techniques. Eye gaze projection may be based, for example, upon the relative displacement of the pupil from the center of eye. Detection of the iris from the one or more frames captured with a digital camera may be made. The pupil can be found using the iris, as the pupil is situated at the center of iris. The iris is a circular region and can be detected, for example using the Hough circle transform technique, among other techniques. An example Hough Circle Transform takes a binary image as an input and may detects the circle in it.

In one or more scenarios, an eye feature may be extracted. Both the viewer's eyes may be independently detected, perhaps for example using the Principal Components Analysis (PCA) technique, among other techniques (e.g., for frontal face recognition). PCA is a statistical approach where face images may be expressed as a subset of their eigenvectors (e.g., "eigenfaces"). PCA may be used in restricted areas of the image, perhaps for example to obtain the (e.g., "main") components of feature points of the face, such as the eigenmouth, the eigennose, and the eigeneyes, among other features. Features points of the eye-corners, the iris, and/or the pupil may be computed as well.

In one or more scenarios a center of the viewer's eye maybe estimation. The relative distance of the (e.g., already found) feature points from the "Centre of Eye" may provide the 2D Gaze vectors for one, or each, eye. The "Center of Eye" can act as a useful reference point for the computation of the gaze vectors and can be computed using the following equations:

$$COE_X = \frac{TopRightCorner(x) + TopLeftCorner(x)}{2}$$

$$COE_Y = \frac{TopRightCorner(y) + BottomRightCorner(y)}{2}$$

From the equations above, $COE_x$ and $COE_y$ denote x and y coordinates of the center of eye's movable region, respectively. The parameters TopRightCorner, TopLeftCorner, BottomRightCorner and BottomLeftCorner may construct a rectangular region representing eye's movable region.

In one or more scenarios, a head pose estimate may be made. PCA techniques may be used with a different image dataset to determine one or more head pose orientations. A head yaw angle (e.g., a head turn left/right), a pitch angle (e.g., a head nod up/down), and/or a roll angle (e.g., a head slant left/right) may be determined. One or more of the angle values, perhaps for example when combined with the "Center of Eye" reference point computation may help determine the pupillary axis along the direction of a viewer's gaze. In one or more scenarios, personalized three-dimension (3D) face template may be created (e.g., offline and/or online) by fitting a 3D Morphable Model to a set of 2D face samples, for example. In one or more scenarios, using the personalized 3D face template, for example, the head pose may be tracked frame-by-frame, perhaps for example using (e.g., "rigid") one or more Iterative Closest Point (ICP) algorithms.

In one or more scenarios, point of gaze (PoG) calculations may be made. PoG calculations may include transforming the one or more 2D gaze vectors to the 3D domain, perhaps for example using the head pose parameters yaw, pitch, and/or roll information. In one or more examples, perhaps using the head pose parameters, for example, a face appearance may be rendered using the inverse rigid transformation. This may result in a frontal version of the face image along the pupillary axis of the gaze direction.

In one or more scenarios, the eye images may be cropped and/or may be compared to at least one frontal gaze appearance model. The obtained gaze direction may be transformed, perhaps for example using the head pose parameters, which may result in 3D gaze vectors for one, or each, viewer eye. In one or more scenarios, a Euclidean geometric intersection of the two 3D gaze vectors on the pupillary axis line may determine the PoG coordinates, for example. The PoG coordinates may be mapped and/or may be translated to the display device coordinates, for example, as described herein.

Technologies that may provide consumers/user/viewers with functionality, service, capabilities for casting a media content/media stream/media content stream from one device of a communication network to another device of the communication network, for example, may be useful. For example, a user/viewer may be watching an over-the-top (OTT) video media content stream/media stream on a first media control device (e.g., a tablet device, a smartphone device, etc.). The first media control device may be part of a user communication network. In one or more scenarios, an event may interfere with the viewer's enjoyment of the media stream on the first media control device.

For example, a call may come through, a message may come through, and/or a battery level may fall below a low threshold, etc., on the first media control device, among other scenarios. One or more of such events may interfere with the viewer's enjoyment of the media stream, if not stopping and/or interrupting the media stream on the first media control device.

Technologies that may initiate a casting of a video/media stream from one media control device to another media control device (e.g., as a PIP media content presentation on the other media control device, among other scenarios) may be useful. For example, the casting of the video/media stream from one media control device to another media control device may be initiated, perhaps when/upon a detection of an occurrence of a casting condition. For example, a casting of the video/media stream from the other media control device to the first media control device, perhaps when/upon a detection of a clearing of the casting condition. A Discovery-and-Launch (DIAL) protocol may be used for casting the video/media stream, among other protocols, for example.

In one or more scenarios, a (e.g., first) media control device may be configured to cast at least one media stream. The first media control device may be in communication with a communication network. The gaze detection & media casting management module 220 may be configured to receive the at least one media stream from a second media control device, perhaps for example via the communication network.

The gaze detection and media casting management module 220 may be configured to ascertain an occurrence of at least one casting condition. The gaze detection & media casting management module 220 may be configured to cast the at least one media stream to at least one other media control device, perhaps for example via the communication network when/upon the at least one casting condition occurs.

The gaze detection & media casting management module 220 may be configured to ascertain a clearance of the at least one casting condition, for example. The gaze detection & media casting management module 220 may be configured to initiate a casting of the at least one media stream from the at least one other media control device, perhaps for example when/upon the at least one casting condition clears. The gaze detection & media casting management module 220 may be configured to receive the at least one media stream from the at least one other media control device, perhaps for example via the communication network.

In one or more scenarios, the at least one media stream may include an over-the-top (OTT) video, cable video, broadcast video, and/or satellite video, among other video, for example. In one or more scenarios, the at least one casting condition may include a low battery detection in the first media control device, an incoming call detection on the first media control device, an incoming message detection on the first media control device, and/or a system update detection on the first media control device.

The routing module 210 can route communications, requests, determinations, and/or detections of captioning media content and/or augmented reality functions by/for the gaze detection & media casting management module 220. For example, the routing module 210 can translate the communications, requests, determinations, and/or detections of controlling media content presentations and/or casting media content into and/or with an address (e.g., IP address) associated with the gaze detection & media casting management module 220. The status detection module 215 may monitor the network connection status of the CPE device 110.

The status detection module 215 may ascertain the status of the network connection for the CPE device 110. The status detection module 215 can monitor the network connection of the CPE device 110 through the network interface 225. The status detection module 215 can monitor one or more various components that are associated with the network connection for the CPE device 110. For example, the status detection module 215 can monitor one or more hardware components (e.g., internal hardware components of the CPE device 110, connection cables such as radio frequency cables, phone lines, and/or digital subscriber lines, etc.) that may be used in the connection of the CPE device 110 to a network. This may include physical status detection (e.g., physical mapping to signal). Perhaps for example if no signal is detected, a physical component may be broken (e.g., broken line or disconnected plug, etc.), among other potential issues. A prompt can instruct a subscriber to check an associated connector and/or line.

The status detection module 215 can monitor the status of the network and/or data link layer(s) associated with the CPE device 110. For example, the status detection module 215 can monitor the CPE device's 110 connection to a host server (e.g., dynamic host configuration protocol server) and/or the status of configuration information received from the host server. For example, the status detection module 215 can monitor the CPE device's 110 connection to a packet routing server (e.g., a point-to-point protocol PPP server) and/or subscriber credentials such as a username and password associated with the packet routing server. Data link layer status may include failed (synchronization failure), connected, on-doing/on-going (synchronizing), and/or others. Perhaps for example in response to a failure, among other scenarios, a re-scan for a cable line and/or retraining for DSL line may be attempted.

The communications, requests, determinations, and/or detections of controlling media content presentations and/or casting media content may be transmitted and/or stored in one or more files, such as text files (e.g., Hypertext Transfer Protocol (HTTP) files), among other type of files.

The CPE device 110 may store one or more, or multiple, files that may be ordered (e.g., hierarchically according to a specific order) for carrying out one or more actions in the setup of a device (e.g., set-top box 110b). The gaze detection & media casting management module 220 may include and/or be in communication with a buffer 235. The buffer 235 can store a subscriber communication (e.g., URL or IP address received from the subscriber) and/or the communications, requests, determinations, and/or detections of controlling media content presentations and/or casting media content.

In one or more scenarios, perhaps for example when the status detection module 215 may ascertain that a network connection issue might no longer exist, the buffer 235 can output the subscriber communication and/or the communications, requests, determinations, and/or detections of controlling media content presentations and/or casting media content through the network interface 225.

In one or more scenarios, media content elements of the electronic content may include one or more of over-the-top (OTT) video, cable video, broadcast video, and/or satellite video, among other types of video content.

Figure 3:
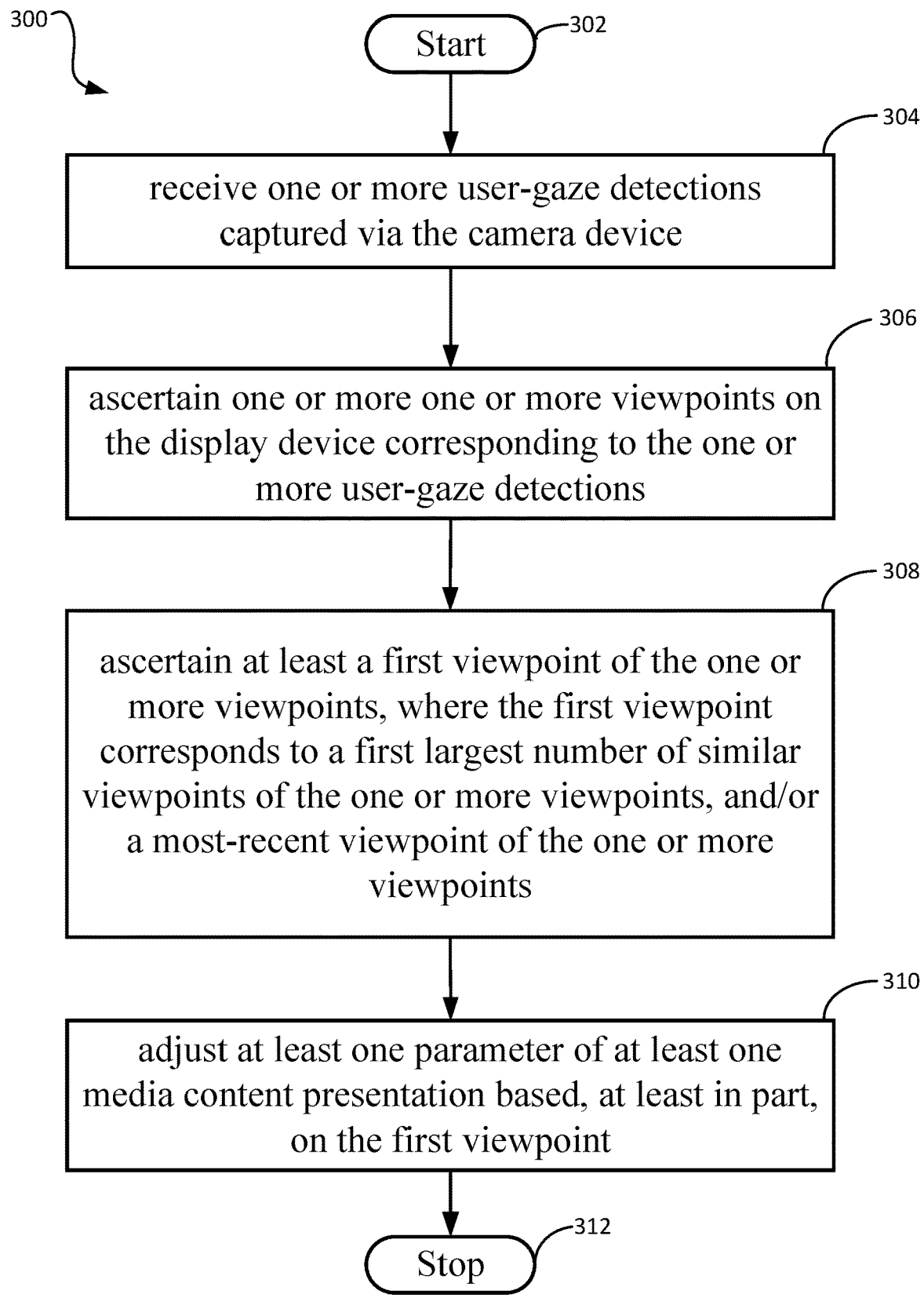
FIG. 3 is an example flow diagram of at least one technique for controlling a media content presentation in a media stream.

Referring now to FIG. 3, a diagram 300 illustrates an example technique for controlling a media content presentation in a media stream that may be performed by a media control device, among other devices. For example, the media control device may be a set-top box such as device 110b, among other devices 110a-110d and/or 140a-140i, and/or a cloud computing device, for example. The media stream may include one or more media content presentations, for example. The media control device may be in communication with a camera device and/or a display device. At 302, the process may start or restart.

At 304, the media control device may receive one or more user-gaze detections captured via the camera device. At 306, the media control device may ascertain one or more one or more viewpoints on the display device corresponding to the one or more user-gaze detections.

At 308 the media control device may ascertain at least a first viewpoint of the one or more viewpoints. The first viewpoint may correspond to a first largest number of similar viewpoints of the one or more viewpoints, and/or a most-recent viewpoint of the one or more viewpoints, for example.

At 310, the media control device may adjust at least one parameter of at least one media content presentation based, at least in part, on the first viewpoint. At 312 the process may stop or restart. In one or more scenarios, the media control device may be a set-top box, a cloud-based computing device, a mobile device, a television, a personal computing device, a home gateway, and/or a media gateway, among other devices.

Figure 4:
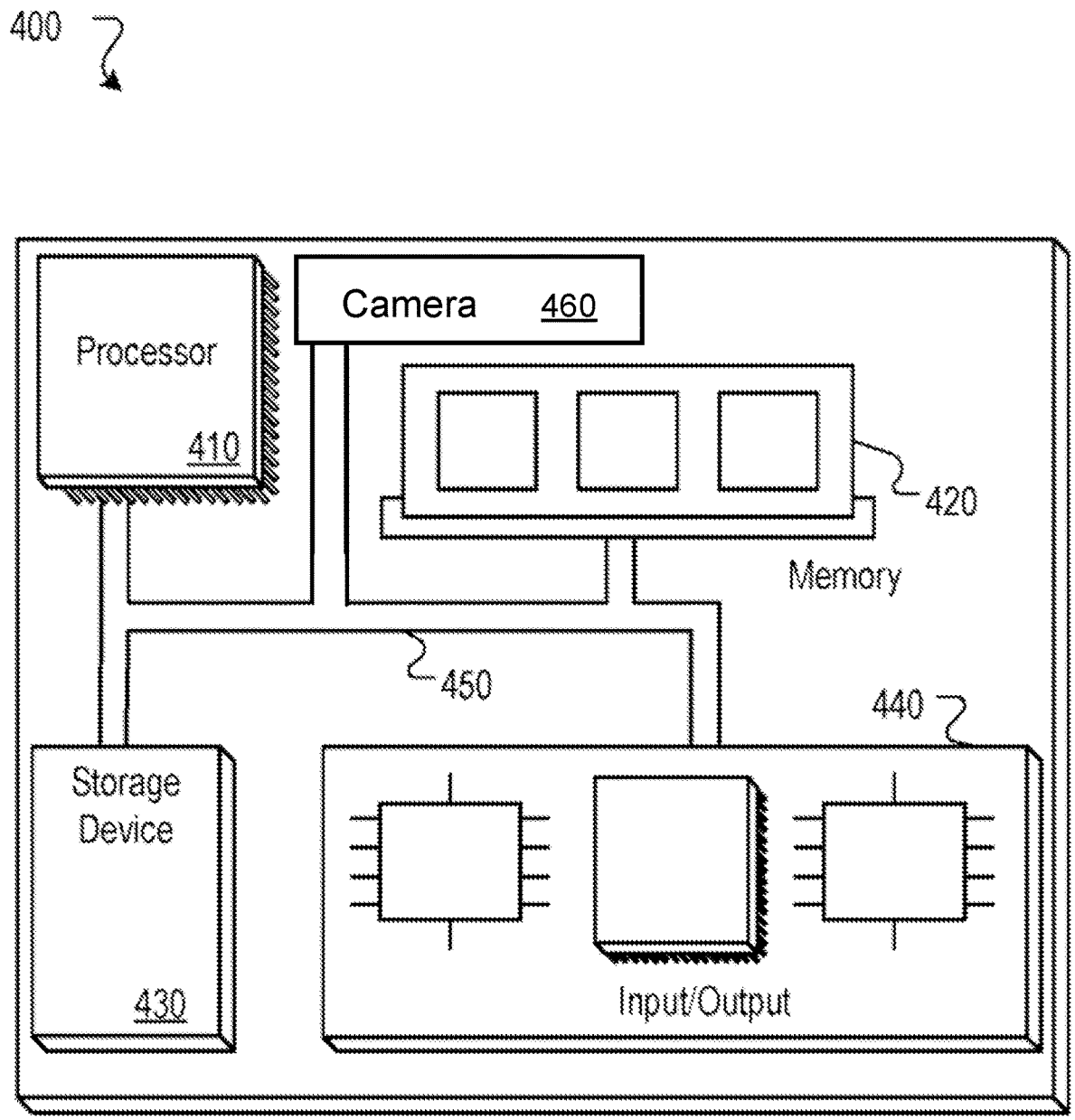
FIG. 4 is a block diagram of a hardware configuration of an example device that may deliver electronic content, such as the CPE device of FIG. 2.

FIG. 4 is a block diagram of a hardware configuration of an example device that may deliver electronic content/media content (e.g., video and/or audio content/components of electronic content), such as the CPE device 110 of FIG. 2, among other devices such as 140a-140i, devices 110a-110d, for example. The hardware configuration 400 may be operable to facilitate delivery of information from an internal server of a device. The hardware configuration 400 can include a processor 410, a memory 420, a storage device 430, and/or an input/output device 440. One or more of the components 410, 420, 430, and 440 can, for example, be interconnected using a system bus 450. The processor 410 can process instructions for execution within the hardware configuration 400. The processor 410 can be a single-threaded processor or the processor 410 can be a multi-threaded processor. The processor 410 can be capable of processing instructions stored in the memory 420 and/or on the storage device 430.

The memory 420 can store information within the hardware configuration 400. The memory 420 can be a computer-readable medium (CRM), for example, a non-transitory CRM. The memory 420 can be a volatile memory unit, and/or can be a non-volatile memory unit.

The storage device 430 can be capable of providing mass storage for the hardware configuration 400. The storage device 430 can be a computer-readable medium (CRM), for example, a non-transitory CRM. The storage device 430 can, for example, include a hard disk device, an optical disk device, flash memory and/or some other large capacity storage device. The storage device 430 can be a device external to the hardware configuration 400.

The input/output device 440 may provide input/output operations for the hardware configuration 400. The input/output device 440 (e.g., a transceiver device) can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). The input/output device can include driver devices configured to send communications to, and/or receive communications from one or more networks (e.g., subscriber network 120 of FIG. 1).

The camera device 460 may provide digital video input/output capability for the hardware configuration 400. The camera device 460 may communicate with any of the elements of the hardware configuration 400, perhaps for example via system bus 450. The camera device 460 may capture digital images and/or may scan images of various kinds, such as Universal Product Code (UPC) codes and/or Quick Response (QR) codes, for example, among other images.

The camera device 460 may include at least one microphone device and/or at least one speaker device. The input/output of the camera device 460 may include audio signals/packets/components, perhaps for example separate/separable from, or in some (e.g., separable) combination with, the video signals/packets/components the camera device 460.

The camera device 460 may also detect the presence of one or more people that may be proximate to the camera device 460 and/or may be in the same general space (e.g., the same room) as the camera device 460. The camera device 460 may gauge a general activity level (e.g., high activity, medium activity, and/or low activity) of one or more people that may be detected by the camera device 460. The camera device 460 may detect one or more general characteristics (e.g., height, body shape, skin color, pulse, heart rate, breathing count, etc.) of the one or more people detected by the camera device 460. The camera device 460 may be configured to recognize one or more specific people, for example.

The camera device 460 may be in wired and/or wireless communication with the hardware configuration 400. In one or more scenarios, the camera device 460 may be external to the hardware configuration 400. In one or more scenarios, the camera device 460 may be internal to the hardware configuration 400.

Figure 5:
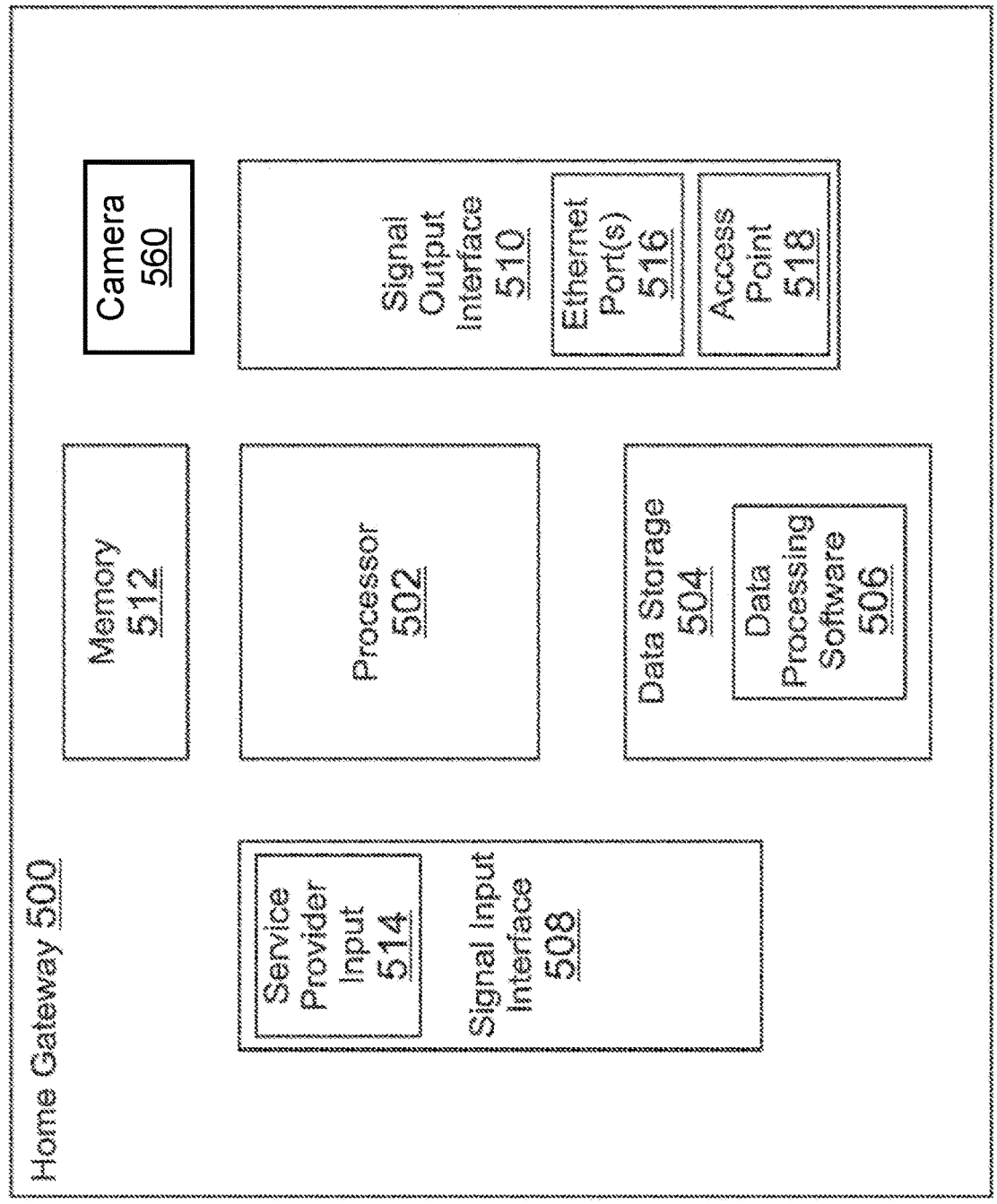
FIG. 5 is a block diagram of a hardware configuration of an example device that may deliver electronic content, such as a home gateway.

FIG. 5 is a block diagram of a hardware configuration of an example device that may deliver electronic content/media content (e.g., video and/or audio components of electronic content), such as a home gateway (e.g., an access point device), among other devices. A hardware configuration 500 (e.g., home gateway 500) may be constructed in a similar manner to hardware configuration 400 in that the architecture may be built around a general-purpose processor, processor 502, and/or an application specific chip set such as designed for use in a Data Over Cable Service Interface Specification (DOCSIS), a Gigabit Passive Optical Network (GPON), and/or a Digital Subscriber Line (DSL) modem. As with processor 402, the general-purpose processor 502 may also be an off-the-shelf processor. The functionality of the desired modem may be implemented through data processing software 506 stored in data storage 504 and/or may be run on processor 502.

Home gateway 500 may include signal input interface 508 and/or signal output interface 510. Signal input interface 508 may include, for example, circuitry to receive data input from a service provider at service provider input 514, e.g., a cable and/or a fiber optic input.

Signal output interface 510 may provide the output of the home gateway 500. Signal output interface 510 may provide signals in formats for transmission over a datalink. For example, interface 510 may include one or more Ethernet ports 516 and/or a wireless access point 518. Data may be communicated over wired and/or wireless networks. The access point 518 may be located external to the home gateway 500. Video and/or audio content received at signal input interface 508 can be streamed from home gateway 500 to hardware configuration 400, perhaps for example as another source of video and/or audio signal. This streaming may be accomplished over a reliable backhaul communication link (not shown) that may provide good video quality, perhaps for example for signals that are sensitive to latency in the signal (e.g., live programming). The signal input interface 508 and the signal output interface 510 may operate together, such as for example as a transceiver device.

In operation, a data signal may be received at signal input interface 508 of home gateway 500. Processor 502 may operate data processing software 506 on general-purpose processor 502 to prepare the received signals (e.g., code, decode, etc.). The output of the data processing software 506 may be output by signal output interface 510, e.g., Ethernet port 516 and/or wireless access point 518.

The camera device 560 may provide digital video input/output capability for the home gateway 500. The camera device 560 may communicate with any of the elements of the home gateway 500. The camera device 560 may capture digital images and/or may scan images of various kinds, such as Universal Product Code (UPC) codes and/or Quick Response (QR) codes, for example, among other images.

The camera device 560 may include at least one microphone device and/or at least one speaker device. The input/output of the camera device 560 may include audio signals/packets/components, perhaps for example separate/separable from, or in some (e.g., separable) combination with, the video signals/packets/components the camera device 560.

The camera device 560 may also detect the presence of one or more people that may be proximate to the camera device 560 and/or may be in the same general space (e.g., the same room) as the camera device 560. The camera device 560 may gauge a general activity level (e.g., high activity, medium activity, and/or low activity) of one or more people that may be detected by the camera device 560. The camera device 560 may detect one or more general characteristics (e.g., height, body shape, skin color, pulse, heart rate, breathing count, etc.) of the one or more people detected by the camera device 560. The camera device 560 may be configured to recognize one or more specific people, for example.

The camera device 560 may be in wired and/or wireless communication with the home gateway 500. In one or more scenarios, the camera device 560 may be external to the home gateway 500. In one or more scenarios, the camera device 560 may be internal to the home gateway 500.

Those skilled in the art will appreciate that the disclosed subject matter improves upon methods and/or apparatuses for controlling a media content presentation in a media stream. For example, the subject matter described herein may provide for location, size, content, generation, etc., adjustments of media content presentations in a media stream, based, at least in part, on detections of a user's/viewer's gaze/attention on/toward a display device. For example, a subject matter content of a first media content presentation (e.g., a primary media content presentation) may be switched with a subject matter content of a second media content presentation (e.g., a sub-window or PIP media content presentation) based, at least in part, on a (e.g., large) number of detections of a viewer's gaze toward the display device location in which the second media content presentation is displayed.

Those skilled in the art will appreciate that the subject matter described herein may at least facilitate a viewer's enjoyment of a media content/media stream by casting the media stream from one media control device to another media control device. For example, perhaps instead of having a media stream stopped on a first media control device, perhaps due to a failing battery on the first media control device, the media stream may be cast to a second media control device. The media stream may be displayed in a sub-window media content presentation on the second media control device, for example. Perhaps for example when/upon charging/replacement of the battery on the first media control device, the media stream may be cast from the second media control device to the first media control device.

The subject matter of this disclosure, and components thereof, can be realized by instructions that upon execution cause one or more processing devices to carry out the processes and/or functions described herein. Such instructions can, for example, comprise interpreted instructions, such as script instructions, e.g., JavaScript or ECMAScript instructions, or executable code, and/or other instructions stored in a computer readable medium.

Implementations of the subject matter and/or the functional operations described in this specification and/or the accompanying figures can be provided in digital electronic circuitry, in computer software, firmware, and/or hardware, including the structures disclosed in this specification and their structural equivalents, and/or in combinations of one or more of them. The subject matter described in this specification can be implemented as one or more computer program products, e.g., one or more modules of computer program instructions encoded on a tangible program carrier for execution by, and/or to control the operation of, data processing apparatus.

A computer program (also known as a program, software, software application, script, or code) can be written in any form of programming language, including compiled or interpreted languages, and/or declarative or procedural languages. It can be deployed in any form, including as a stand-alone program or as a module, component, subroutine, and/or other unit suitable for use in a computing environment. A computer program may or might not correspond to a file in a file system. A program can be stored in a portion of a file that holds other programs and/or data (e.g., one or more scripts stored in a markup language document), in a single file dedicated to the program in question, and/or in multiple coordinated files (e.g., files that store one or more modules, sub programs, or portions of code). A computer program can be deployed to be executed on one computer or on multiple computers that may be located at one site or distributed across multiple sites and/or interconnected by a communication network.

The processes and/or logic flows described in this specification and/or in the accompanying figures may be performed by one or more programmable processors executing one or more computer programs to perform functions by operating on input data and/or generating output, thereby tying the process to a particular machine (e.g., a machine programmed to perform the processes described herein). The processes and/or logic flows can also be performed by, and apparatus can also be implemented as, special purpose logic circuitry, e.g., an FPGA (field programmable gate array) and/or an ASIC (application specific integrated circuit).

Computer readable media suitable for storing computer program instructions and/or data may include all forms of non-volatile memory, media and memory devices, including by way of example semiconductor memory devices (e.g., EPROM, EEPROM, and/or flash memory devices); magnetic disks (e.g., internal hard disks or removable disks); magneto optical disks; and/or CD ROM and DVD ROM disks. The processor and/or the memory can be supplemented by, or incorporated in, special purpose logic circuitry.

While this specification and the accompanying figures contain many specific implementation details, these should not be construed as limitations on the scope of any invention and/or of what may be claimed, but rather as descriptions of features that may be specific to described example implementations. Certain features that are described in this specification in the context of separate implementations can also be implemented in combination in perhaps one implementation. Various features that are described in the context of perhaps one implementation can also be implemented in multiple combinations separately or in any suitable subcombination. Although features may be described above as acting in certain combinations and/or perhaps even (e.g., initially) claimed as such, one or more features from a claimed combination can in some cases be excised from the combination. The claimed combination may be directed to a sub-combination and/or variation of a sub-combination.

While operations may be depicted in the drawings in an order, this should not be understood as requiring that such operations be performed in the particular order shown and/or in sequential order, and/or that all illustrated operations be performed, to achieve useful outcomes. The described program components and/or systems can generally be integrated together in a single software product and/or packaged into multiple software products.

Examples of the subject matter described in this specification have been described. The actions recited in the claims can be performed in a different order and still achieve useful outcomes, unless expressly noted otherwise. For example, the processes depicted in the accompanying figures do not require the particular order shown, and/or sequential order, to achieve useful outcomes. Multitasking and parallel processing may be advantageous in one or more scenarios.

While the present disclosure has been illustrated and described in detail in the drawings and foregoing description, the same is to be considered as illustrative and not restrictive in character, it being understood that only certain examples have been shown and described, and that all changes and modifications that come within the spirit of the present disclosure are desired to be protected.

What is claimed is:

1. A method performed by a media control device for controlling at least one media content presentation in a media stream, the media stream including one or more media content presentations, the media control device being in communication with a camera device and a display device, the method comprising:
- receiving, by the media control device, one or more user-gaze detections captured via the camera device;
- ascertaining, by the media control device, one or more viewpoints on the display device corresponding to the one or more user-gaze detections;
- ascertaining, by the media control device, at least a first viewpoint of the one or more viewpoints, the first viewpoint corresponding to at least one of: a first largest number of similar viewpoints of the one or more viewpoints, or a most-recent viewpoint of the one or more viewpoints; and
- adjusting, by the media control device, at least one parameter of a first media content presentation based, at least in part, on the first viewpoint, wherein the adjusting the at least one parameter of the first media content presentation based on the first viewpoint further comprises:
 - restricting, by the media control device, at least one of: a location of at least a second media content presentation from a location proximate to the first viewpoint, or a generation of the at least second media content presentation from a location proximate to the first viewpoint.

2. The method of claim 1, wherein the at least one parameter comprises at least one of:
- a content of the at least one media content presentation, a generation of the at least one media content presentation, a location of the at least one media content presentation, or a size of the at least one media content presentation.

3. The method of claim 2, wherein the media control device is in communication with a microphone device, the media stream includes at least a first media content presentation, and the adjusting the at least one parameter of the at least one media content presentation based on the first viewpoint further comprises:
- receiving, by the media control device, a first user-voice input via the microphone device, the first user-voice input corresponding to a user request to generate at least a second media content presentation;
- generating, by the media control device, the second media content presentation based, at least in part, on the first user-voice input;
- receiving, by the media control device, a second user-voice input via the microphone device, the second user-voice input corresponding to at least one of: a size of the second media content presentation, or a content of the second media content presentation;
- ascertaining, by the media control device, a location of the second media content presentation based, at least in part, on the first viewpoint; and
- arranging, by the media control device, at least one of: the location of the second media content presentation on the display device, the content of the second media content presentation, or the size of the second media content presentation on the display device.

4. The method of claim 1, wherein the first media content presentation is displayed at a first display device location, the second media content presentation is displayed at a second display device location, and the restricting the location of at least the second media content presentation from the location proximate to the first viewpoint, or the generation of the at least the second media content presentation from the location proximate to the first viewpoint further comprises:
- ascertaining, by the media control device, that the first viewpoint corresponds to the second display device location; and
- switching, by the media control device, a content of the first media content presentation with a content of the second media content presentation upon the ascertaining that the first viewpoint corresponds to the second display device location.

5. The method of claim 1, further comprising:
- ascertaining, by the media control device, that the first media content presentation has a priority greater than that of a priority of the second media content presentation, wherein the restricting is based on the priority comparison.

6. The method of claim 5, further comprising:
- ascertaining, by the media control device, that the priority of the first media content presentation is greater than the priority of the second media content presentation based on at least of one: a default media content presentation priority hierarchy, or a user-provided media content presentation priority.

7. The method of claim 1, wherein the media control device is at least one of: a set-top box, a home gateway, a cloud-based computing device, an Internet Gateway, a router, a smart media device, a mobile device, a media gateway, a television, or a personal computing device.

8. The method of claim 1, wherein the first media content presentation includes at least one of: a content window, or a content field.

9. The method of claim 8, wherein the content window is at least one of: a main window, a sub-window, or a picture-in-picture (PIP), and the content field is at least one of: an alert field, a subtitle field, or a closed-captioning field.

10. A media control device configured to control at least one media content presentation in a media stream, the media stream including one or more media content presentations, the media control device being in communication with a camera device and a display device, the media control device comprising:
- a memory; and
- a processor, the processor configured at least to:
 - receive one or more user-gaze detections captured via the camera device;
 - ascertain one or more viewpoints on the display device corresponding to the one or more user-gaze detections;
 - ascertain at least a first viewpoint of the one or more viewpoints, the first viewpoint corresponding to at least one of: a first largest number of similar viewpoints of the one or more viewpoints, or a most-recent viewpoint of the one or more viewpoints; and
 - adjust at least one parameter of a first media content presentation based, at least in part, on the first viewpoint, such that to adjust the at least one parameter of the first media content presentation based on the first viewpoint the processor is further configured to:
  - restrict, by the media control device, at least one of: a location of at least a second media content presentation from a location proximate to the first viewpoint, or a generation of the at least second media content presentation from a location proximate to the first viewpoint.

11. The media control device of claim 10, wherein the processor is further configured such that the at least one parameter comprises at least one of: a content of the at least one media content presentation, a generation of the at least one media content presentation, a location of the at least one media content presentation, or a size of the at least one media content presentation.

12. The media control device of claim 11, wherein the first media content presentation is displayed at a first display device location, the second media content presentation is displayed at a second display device location, and such that to restrict the location of at least the second media content presentation from the location proximate to the first viewpoint, or the generation of the at least the second media content presentation from the location proximate to the first viewpoint the processor is further configured to:
   ascertain that the first viewpoint corresponds to the second display device location; and
   switch a content of the first media content presentation with a content of the second media content presentation upon the ascertainment that the first viewpoint corresponds to the second display device location.

13. The media control device of claim 11, wherein the media control device is in communication with a microphone device, the media stream includes at least a first media content presentation, and such that to adjust the at least one parameter of the at least one media content presentation based on the first viewpoint the processor is further configured to:
   receive a first user-voice input via the microphone device, the first user-voice input corresponding to a user request to generate at least a second media content presentation;
   generate the second media content presentation based, at least in part, on the first user-voice input;
   receive a second user-voice input via the microphone device, the second user-voice input corresponding to at least one of: a size of the second media content presentation, or a content of the second media content presentation;
   ascertain a location of the second media content presentation based, at least in part, on the first viewpoint; and
   arrange at least one of: the location of the second media content presentation on the display device, the content of the second media content presentation, or the size of the second media content presentation on the display device.

14. The media control device of claim 10, wherein the processor is further configured to:
   ascertain that the first media content presentation has a priority greater than that of a priority of the second media content presentation, wherein the processor is further configured such that the restriction is based on the priority comparison.

15. The media control device of claim 14, wherein the processor is further configured to:
   ascertain that the priority of the first media content presentation is greater than the priority of the second media content presentation based on at least of one: a default media content presentation priority hierarchy, or a user-provided media content presentation priority.

16. The media control device of claim 10, wherein the media control device is at least one of: a set-top box, a home gateway, a cloud-based computing device, an Internet Gateway, a router, a smart media device, a mobile device, a media gateway, a television, or a personal computing device.

17. The media control device of claim 10, wherein the processor is further configured such that the first media content presentation includes at least one of: a content window, or a content field.

18. The media control device of claim 17, wherein the processor is further configured such that the content window is at least one of: a main window, a sub-window, or a picture-in-picture (PIP), and the content field is at least one of: an alert field, a subtitle field, or a closed-captioning field.

19. A non-transitory computer readable medium having instructions stored thereon, the instructions causing at least one processor of a media control device to perform one or more operations, the media control device being in communication with a camera device and a display device, the one or more operations comprising at least:
   receiving one or more user-gaze detections captured via the camera device;
   ascertaining one or more viewpoints on the display device corresponding to the one or more user-gaze detections;
   ascertaining at least a first viewpoint of the one or more viewpoints, the first viewpoint corresponding to at least one of: a first largest number of similar viewpoints of the one or more viewpoints, or a most-recent viewpoint of the one or more viewpoints; and
   adjusting at least one parameter of a first media content presentation in a media stream based, at least in part, on the first viewpoint, wherein the one or more operations for the adjusting the at least one parameter of the first media content presentation based on the first viewpoint further comprise:
   restricting at least one of: a location of at least a second media content presentation from a location proximate to the first viewpoint, or a generation of the at least second media content presentation from a location proximate to the first viewpoint.

20. The non-transitory computer readable medium of claim 19, wherein the one or more instructions provide that the at least one parameter comprises at least one of:
   a content of the at least one media content presentation, a generation of the at least one media content presentation, a location of the at least one media content presentation, or a size of the at least one media content presentation.

21. The non-transitory computer readable medium of claim 20, wherein the first media content presentation is displayed at a first display device location, the second media content presentation is displayed at a second display device location, and the one or more operations for the restricting the location of at least the second media content presentation from the location proximate to the first viewpoint, or the generation of the at least the second media content presentation from the location proximate to the first viewpoint further comprise:
   ascertaining that the first viewpoint corresponds to the second display device location; and
   switching a content of the first media content presentation with a content of the second media content presentation upon the ascertaining that the first viewpoint corresponds to the second display device location.

22. The non-transitory computer readable medium of claim 20, wherein the media control device is in communication with a microphone device, the media stream includes at least a first media content presentation, and the one or more operations for the adjusting the at least one parameter of the at least one media content presentation based on the first viewpoint further comprise:
   receiving a first user-voice input via the microphone device, the first user-voice input corresponding to a user request to generate at least a second media content presentation;

generating the second media content presentation based, at least in part, on the first user-voice input;

receiving a second user-voice input via the microphone device, the second user-voice input corresponding to at least one of: a size of the second media content presentation, or a content of the second media content presentation;

ascertaining a location of the second media content presentation based, at least in part, on the first viewpoint; and arranging at least one of: the location of the second media content presentation on the display device, the content of the second media content presentation, or the size of the second media content presentation on the display device.

23. The non-transitory computer readable medium of claim 19, wherein the one or more operations further comprise:

ascertaining that the first media content presentation has a priority greater than that of a priority of the second media content presentation, wherein the restricting is based on the priority comparison.

24. The non-transitory computer readable medium of claim 23, wherein the one or more operations further comprise:

ascertaining that the priority of the first media content presentation is greater than the priority of the second media content presentation based on at least of one: a default media content presentation priority hierarchy, or a user-provided media content presentation priority.

25. The non-transitory computer readable medium of claim 19, wherein the one or more instructions provide that the first media content presentation includes at least one of: a content window, or a content field.

26. The non-transitory computer readable medium of claim 25, wherein the one or more operations provide that the content window is at least one of: a main window, a sub-window, or a picture-in-picture (PIP), and the content field is at least one of: an alert field, a subtitle field, or a closed-captioning field.

27. A method performed by a first media control device for casting at least one media stream, the first media control device being in communication with a communication network, the method comprising:

receiving, by a media control device, the at least one media stream from a second media control device via the communication network;

ascertaining, by the media control device, an occurrence of at least one casting condition;

casting, by the media control device, the at least one media stream to at least one other media control device via the communication network upon the occurrence of the at least one casting condition;

ascertaining, by the media control device, a clearance of the at least one casting condition;

initiating, by the media control device, a casting of the at least one media stream from the at least one other media control device upon the clearance of the at least one casting condition; and receiving, by the media control device, the at least one media stream from the at least one other media control device via the communication network.

28. The method of claim 27, wherein the at least one media stream includes at least one of: over-the-top (OTT) video, cable video, broadcast video, or satellite video.

29. The method of claim 27, wherein the at least one casting condition includes one or more of: a low battery detection in the first media control device, an incoming call detection on the first media control device, an incoming message detection on the first media control device, or a system update detection on the first media control device.

30. The method of claim 27, wherein the first media control device is at least one of: a set-top box, a home gateway, a cloud-based computing device, an Internet Gateway, a router, a smart media device, a mobile device, a media gateway, a television, or a personal computing device.

31. A first media control device configured to process at least one media stream, the first media control device being in communication with a communication network, the first media control device comprising:

a memory; and a processor, the processor configured at least to:

receive the at least one media stream from a second media control device via the communication network;

ascertain an occurrence of at least one casting condition;

cast the at least one media stream to at least one other media control device via the communication network upon the occurrence of the at least one casting condition;

ascertain a clearance of the at least one casting condition;

initiate a casting of the at least one media stream from the at least one other media control device upon the clearance of the at least one casting condition; and receive the at least one media stream from the at least one other media control device via the communication network.

32. The first media control device of claim 31, wherein the processor is further configured such that the at least one media stream includes at least one of: over-the-top (OTT) video, cable video, broadcast video, or satellite video.

33. The first media control device of claim 31, wherein the processor is further configured such that the at least one casting condition includes one or more of: a low battery detection in the first media control device, an incoming call detection on the first media control device, an incoming message detection on the first media control device, or a system update detection on the first media control device.

34. A non-transitory computer readable medium having instructions stored thereon, the instructions causing at least one processor of a media control device to perform one or more operations, the media control device being in communication with a communication network, the one or more operations comprising at least:

receiving at least one media stream from a second media control device via the communication network;

ascertaining an occurrence of at least one casting condition;

casting the at least one media stream to at least one other media control device via the communication network upon the occurrence of the at least one casting condition;

ascertaining a clearance of the at least one casting condition;

initiating a casting of the at least one media stream from the at least one other media control device upon the clearance of the at least one casting condition; and receiving the at least one media stream from the at least one other media control device via the communication network.

35. The non-transitory computer readable medium of claim 34, wherein the one or more operations provide that the at least one media stream includes at least one of: over-the-top (OTT) video, cable video, broadcast video, or satellite video.

36. The non-transitory computer readable medium of claim 34, wherein the one or more operations provide that the at least one casting condition includes one or more of: a low battery detection in the media control device, an incoming call detection on the media control device, an incoming message detection on the media control device, or a system update detection on the media control device.

* * * * *